US012802584B2

(12) United States Patent
Tseng

(10) Patent No.: US 12,802,584 B2
(45) Date of Patent: Nov. 17, 2026

(54) SET BASED RECOMMENDATION METHOD, SYSTEM AND DEVICE

(71) Applicant: National Central University, Taoyuan City (TW)

(72) Inventor: Kuo-Shih Tseng, Taoyuan City (TW)

(73) Assignee: National Central University, Taoyuan City (TW)

( * ) Notice: Subject to any disclaimer, the term of this patent is extended or adjusted under 35 U.S.C. 154(b) by 175 days.

(21) Appl. No.: 18/805,726

(22) Filed: Aug. 15, 2024

(65) Prior Publication Data

US 2025/0356775 A1 Nov. 20, 2025

(30) Foreign Application Priority Data

May 20, 2024 (TW) ................................ 113118603

(51) Int. Cl.
*G09B 7/00* (2006.01)

(52) U.S. Cl.
CPC ..................................... *G09B 7/00* (2013.01)

(58) Field of Classification Search
None
See application file for complete search history.

(56) References Cited

U.S. PATENT DOCUMENTS 10,115,146 B1 * 10/2018 Anderson .......... G06Q 30/0631
11,315,165 B2 * 4/2022 Korpeoglu ......... G06Q 30/0255
2009/0265404 A1 * 10/2009 Tzeng ..................... G06F 17/16 708/208
2011/0184806 A1 * 7/2011 Chen .................. G06Q 30/0257 705/347
2013/0211950 A1 * 8/2013 Nice .................. G06Q 30/0631 705/26.7
2022/0245709 A1 * 8/2022 Ma .......................... G06F 18/22

FOREIGN PATENT DOCUMENTS

CN 113495989 A 10/2021

* cited by examiner

*Primary Examiner* — Steve Rowland
*Assistant Examiner* — Ishayu Singh
(74) *Attorney, Agent, or Firm* — Demian K. Jackson; Jackson IPG PLLC

(57) ABSTRACT

The present invention relates to a set based recommendation method. The method includes steps of pre-establishing a spatial coverage function comprising a spatial coverage for each of a plurality of points of interest in a multi-dimensional space based on a multi-dimensional space information; receiving a user information through a user device and transmitting it to a computing server; rendering the computing server to compute the spatial coverage between a plurality of candidate objects and the each of the plurality of points of interest based on the spatial coverage function and the user information, and selecting a first candidate object having a maximum coverage expected value from the plurality of candidate objects as a recommended object; and instantly outputting the recommended object to a set based recommendation operation interface displayed on the user device.

8 Claims, 7 Drawing Sheets

(a) User answers questions (b) AI evaluates user's ability (c) AI recommends question types based on user weaknesses (d) AI generates recommended question types

400

700

SET BASED RECOMMENDATION METHOD, SYSTEM AND DEVICE

CROSS-REFERENCE TO RELATED APPLICATION

This application claims priority benefit to Taiwan Invention Patent Application Serial No. 113118603, filed on May 20, 2024, in Taiwan Intellectual Property Office, the entire disclosures of which are incorporated by reference herein.

FIELD

The present invention relates to a set based recommendation method, system and device, in particular to a set based recommendation method, system and device for finding a maximum coverage based on approximate optimal solutions.

BACKGROUND

In the modern information era, information recommendation systems have become an indispensable part of various application fields. These systems aim to recommend objects or content that users might be interested in based on their preferences and historical behavior. Among the prior arts used, current information recommendation systems are mainly categorized into three types: content-based, collaborative filtering, and machine learning-based.

Content-based recommendation systems recommend objects with similar features based on the content attributes of the objects selected by users. For example, in U.S. Pat. No. 11,698,932 B2, Spotify® recommends new music content to users based on the content features of the music they have listened to. However, content-based recommendation systems rely too heavily on content attributes, rendering it difficult to discover objects with significant differences, thus limiting the diversity of recommendations.

Collaborative filtering recommendation systems utilize the similarity of objects selected by multiple users to recommend objects to other users. For example, in U.S. Pat. No. 9,348,898 B2, Microsoft® constructs a matrix of user preferences to record the degree of user preference for an object (such as the number of stars) and then makes recommendations to others based on this matrix. Although collaborative filtering recommendation systems can leverage group preferences, this method requires a large amount of user data. Moreover, its effectiveness may be limited in contexts where individual user differences are emphasized, making it unsuitable for situations that value individual user differences.

Machine learning-based recommendation systems train machine learning algorithms to infer the user's likely preference for other objects not yet selected based on the objects the user has already chosen, and then make recommendations accordingly. For example, in U.S. Pat. No. 11,100,400 B2, convolutional neural networks are used to learn user visual preferences and then recommend objects that the user may like. However, these systems require collecting large amounts of user data for training to obtain useful models, and the training process consumes significant computational resources.

However, when faced with the context of individual learning, the above three recommendation systems have certain limitations. Take the math question type recommendation system as an example; an individual's learning trajectory is crucial. Content-based recommendation systems may only recommend similar question types, failing to effectively expand the user's range of problem-type practice. Although collaborative filtering recommendation systems can utilize data from multiple users to recommend similar question types, this method cannot effectively make recommendations based on individual user characteristics since each person's learning curve is different. Machine learning-based recommendation systems require a large amount of training data to predict user preferences, which may be difficult to obtain in the context of individual learning.

In summary, existing recommendation systems have certain limitations in the context of individual learning, making it difficult to simultaneously consider the issues of recommendation diversity, personalization, and data requirements. To overcome these problems, the present invention proposes a set concept-based recommendation system, aiming to provide a recommendation method that is more suitable for individual learning contexts.

Hence, there is a need to solve the above deficiencies/issues.

SUMMARY

The present invention relates to a set based recommendation method, system and device, in particular to a set based recommendation method, system and device for finding a maximum coverage based on approximate optimal solutions.

The present invention provides a set based recommendation method. The method includes pre-establishing a spatial coverage function comprising a spatial coverage for each of a plurality of points of interest in a multi-dimensional space based on a multi-dimensional space information; receiving a user information through a user device and transmitting it to a computing server; rendering the computing server to compute the spatial coverage between a plurality of candidate objects and the each of the plurality of points of interest based on the spatial coverage function and the user information, and selecting a first candidate object having a maximum coverage expected value from the plurality of candidate objects as a recommended object; and instantly outputting the recommended object to a set based recommendation operation interface displayed on the user device.

The present invention further provides a set based recommendation system. The system includes a user device configured to receive a user information; and a computing server configured to receive the user information, compute a spatial coverage between a plurality of candidate objects and each of a plurality of points of interest based on a spatial coverage function and the user information, select a first candidate object having a maximum coverage expected value from the plurality of candidate objects as a recommended object, and instantly output the recommended object to a set based recommendation operation interface displayed on the user device, wherein the spatial coverage function is pre-established based on a multi-dimensional space information and comprises the spatial coverage for the each of the plurality of points of interest in a multi-dimensional space.

The present invention further provides a set based recommendation device. The device includes a display unit configured to display a set based recommendation operation interface for receiving a user information; and a processor unit configured to receive the user information, compute a spatial coverage between a plurality of candidate objects and each of a plurality of points of interest based on a spatial coverage function and the user information, select a first candidate object having a maximum coverage expected value from the plurality of candidate objects as a recommended object, and instantly output the recommended object to a set based recommendation operation interface displayed on the user device, wherein the spatial coverage function is pre-established based on a multi-dimensional space information and comprises the spatial coverage for the each of the plurality of points of interest in a multi-dimensional space.

The above content described in the summary is intended to provide a simplified summary for the presently disclosed invention, so that readers are able to have an initial and basic understanding to the presently disclosed invention. The above content is not aimed to reveal or disclose a comprehensive and detailed description for the present invention, and is never intended to indicate essential elements in various embodiments in the present invention, or define the scope or coverage in the present invention.

DESCRIPTION OF THE DRAWINGS

A more complete appreciation of the invention and many of the attendant advantages thereof are readily obtained as the same become better understood by reference to the following detailed description when considered in connection with the accompanying drawing, wherein.

DETAILED DESCRIPTION

Figure 1:
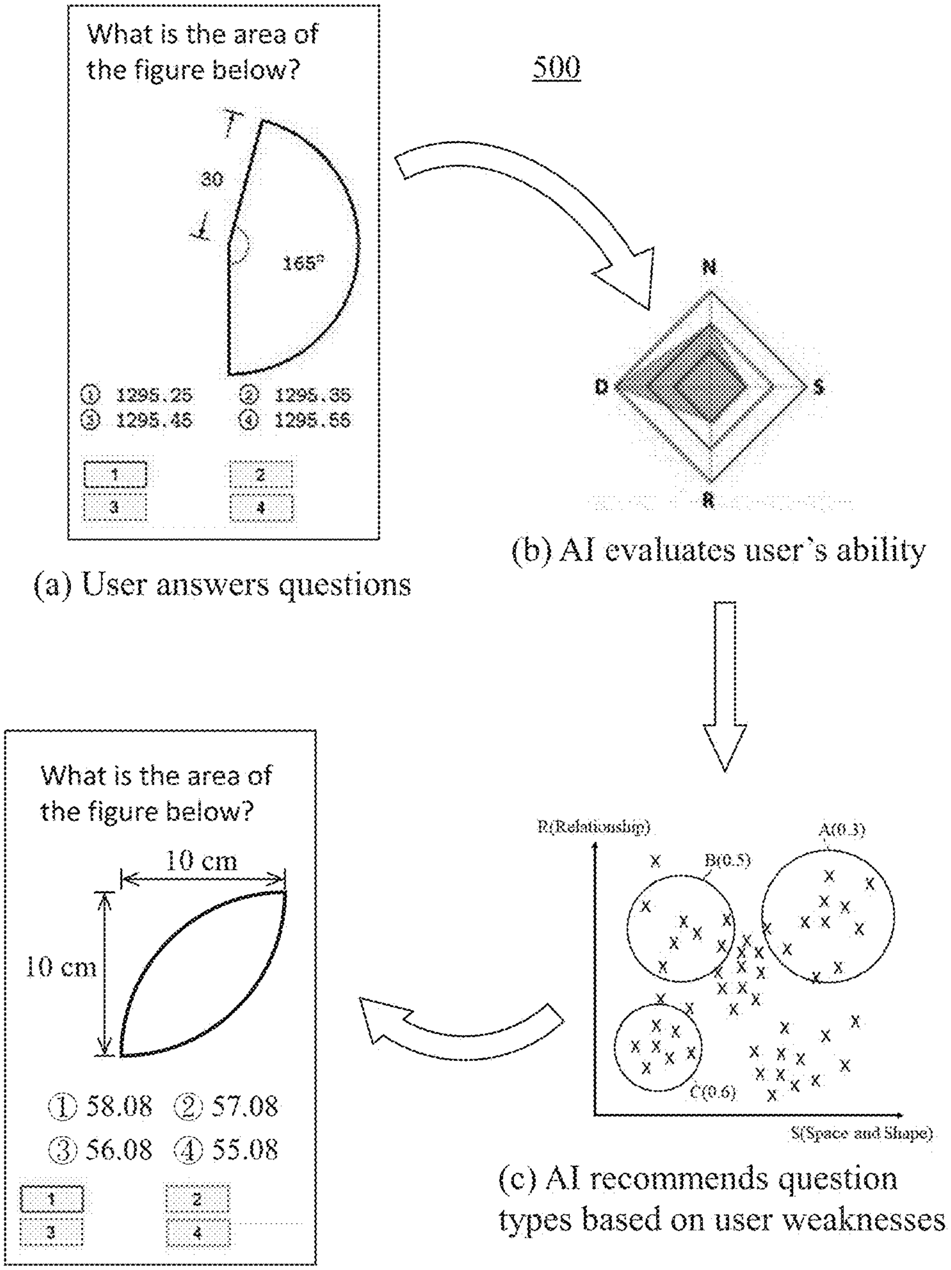
FIG. 1 is a conceptual diagram illustrating the first embodiment for the set based recommendation method according to the present invention.

The present disclosure will be described with respect to particular embodiments and with reference to certain drawings, but the disclosure is not limited thereto but is only limited by the claims. The drawings described are only schematic and are non-limiting. In the drawings, the size of some of the elements may be exaggerated and not drawn on scale for illustrative purposes. The dimensions and the relative dimensions do not necessarily correspond to actual reductions to practice.

It is to be noticed that the term "including," used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device including means A and B" should not be limited to devices consisting only of components A and B.

The disclosure will now be described by a detailed description of several embodiments. It is clear that other embodiments can be configured according to the knowledge of persons skilled in the art without departing from the true technical teaching of the present disclosure, the claimed disclosure being limited only by the terms of the appended claims.

The set based recommendation method described in the present invention is preferably re-defined as a submodular maximization problem, which includes an NP-hard problem, either the maximum coverage problem, which is to seek out K maximum coverage sets from N ground sets. That is the problem is re-described as follows: when the maximum coverage problem has submodularity or diminishing returns property, an approximate optimal solution with theoretical guarantee is obtained by the greedy algorithm.

To solve the above maximum coverage problem above, it is necessary to find the K sets with the maximum coverage out of from among N sub-objective sets, which is an NP-complete problem. If an exhaustive search scheme is applied to find out the optimal solution, with each query taking $10^{-3}$ seconds, it will take a total of 129,048,000,340 years to compute. However, since the maximum coverage problem has submodularity, i.e., the property of diminishing marginal returns, if a greedy algorithm is applied instead, an approximate optimal solution can be obtained in polynomial time, with an approximation ratio of (1-1/e), which means that the solution obtained is guaranteed to be higher than (1-1/e)*OPT, where the parameter OPT is the optimal solution. Therefore, the present invention proposes to utilize submodularity and the greedy algorithm to solve the problem efficiently.

Thus, the set based recommendation method according to the present invention is then transformed into a submodular function problem, i.e., finding out the maximum coverage of the submodular function. First, a sub-objective ground set $S=\{1, 2, \ldots, N\}$ must be given, and then K sub-objectives are searched through, such that the coverage of a point of interest, including but not limited to: a question type or a sensor, is maximized, i.e. max $F_c(S_g)$, where $F_c$ is the spatial coverage function or the spatial coverage rate function, $S_g \subseteq S$, $|S_g| \leq K$.

In order to find out the optimal $S_g$, it has to try $N^K$ sets. Assuming K=6, if each query $F_C(S_g)$ takes $10^{-3}$ seconds, and if an exhaustive search scheme is used to execute all queries to find out the optimal solution, it may take 34,048,129,000 years to complete the computation.

Then, the user may not necessarily like or correctly answer the question types that are recommended by the recommendation system. Therefore, the problem itself has the characteristic of uncertainty. Hence, the present invention further proceeds to convert the set based recommendation problem into an adaptive submodularity problem, i.e., to convert the problem into a problem of how to maximize the coverage of K when the problem itself has uncertainty. In this way, a nearly optimal solution can be obtained by implementing the greedy algorithm. Therefore, when the set based recommendation method proposed in the present invention has the recommendation target that is set to recommend objects in which users are weaker, the problem is re-defined as the maximum coverage problem under uncertain conditions.

FIG. 1 is a conceptual diagram illustrating the first embodiment for the set based recommendation method according to the present invention. FIG. 1 shows the conceptual flow according to the present invention. The set based recommendation method 500 according to the present invention includes: step (a) user answering questions, step (b) evaluating user's ability, step (c) system recommending question types based on user weaknesses, and step (d) system generating recommended question types.

Taking Taiwan's 108th year (2019) curriculum guidelines and the field of mathematics thereof as an example, mathematics is further divided into 4 to 5 sub-fields. For example, mathematics is divided into four sub-fields including but not limited to: N: calculation, unit; S: space, shape, geometry; R: relationship, algebra; and D: statistics. The user's ability distributed in the above four sub-fields, which corresponds to four-dimensional space of NSRD, can be presented in a radar chart, to demonstrate the user's ability distribution in each of the four sub-fields. The NSRD is computed by weighting the correct answer rate, which is obtained by the number of correct answers over the total number of questions for each unit and each difficulty level. The difficulty levels are weighted as follows: easy is 1, normal is 2, difficult is 3 and challenging is 4. In this embodiment, the recommendation target of the set based recommendation method is to recommend the knowledge points in which the user is weaker.

In step (a), the user selects and submits an answer and the system is configured to compare the user's answer with the correct answer. Then, in step (b), the system is configured to generate a statistic of the user's ability based on the user's answer. In step (c), the system is configured to project the question types into a multi-dimensional space, such as but not limited to NSRD space, and calculate the question types with the maximum coverage. Finally, in step (d), the system is configured to generate recommended question types for the user.

In this embodiment, the multi-dimensional space is preferably, for example but not limited to, a four-dimensional space consisting of four sub-fields of N-S-R-D. The point of interest is preferably, for example but not limited to, a knowledge point or other points of interest. The recommended object is preferably, for example but not limited to, a recommended question type.

Figure 2:
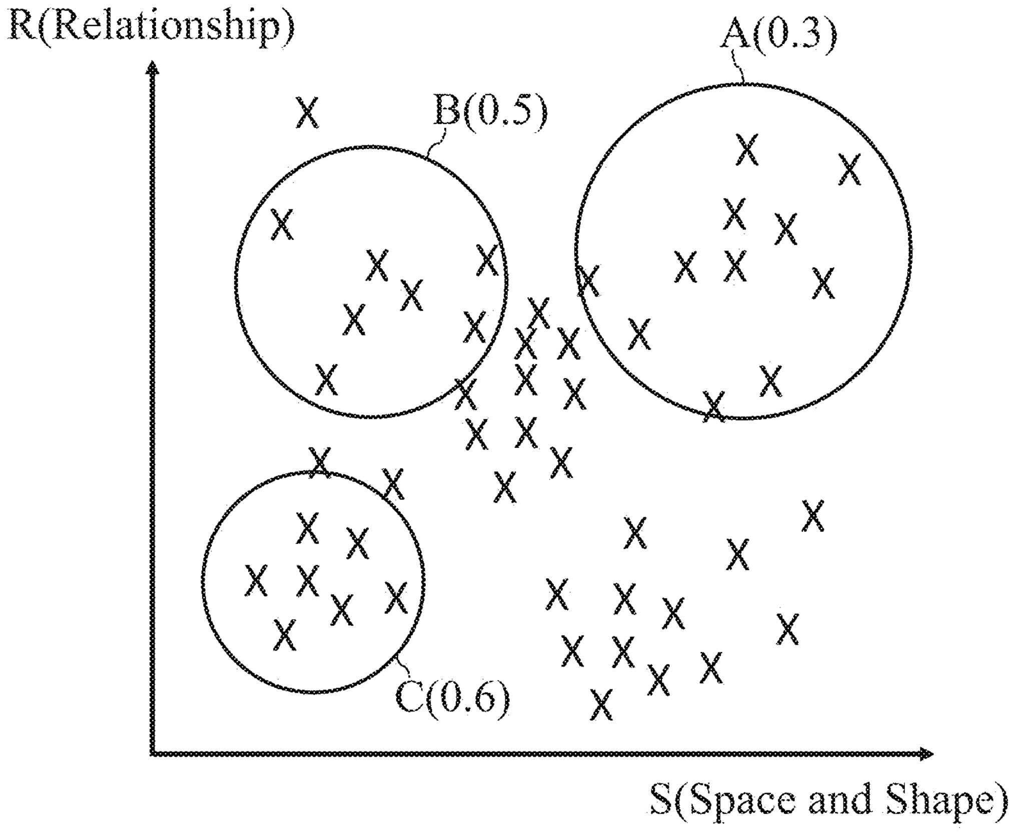
FIG. 2 is a conceptual diagram illustrating the second embodiment for the set based recommendation method according to the present invention.

FIG. 2 is a conceptual diagram illustrating the second embodiment for the set based recommendation method according to the present invention. FIG. 2 is also a schematic diagram illustrating the two-dimensional probability model included in the present invention. In this embodiment, a two-dimensional space consisting of only two sub-fields of S-R is used as an example to describe the core concept according to the present invention. Taking mathematical question types as an example, it is assumed that each point X represents a knowledge point, and the circle A, circle B, and circle C represent three different question types, respectively. Each question type preferably contains one or more questions and has different ranges of knowledge point coverage. The goal of the recommendation is to maximize the coverage of the recommended question types as much as possible.

In this embodiment, it is assumed that the question type represented by the circle A may preferably cover a total of 11 knowledge points X, the question type represented by the circle B may preferably cover a total of 7 knowledge points X, and the question type represented by the circle C may preferably cover a total of 7 knowledge points X. Under the ideal condition without considering the correct answer rate or uncertainty, the selection of the question type represented by the circle A produces the maximum coverage, i.e. covers the most knowledge points X.

However, since it is impossible to predict whether the user will be able to correctly answer the recommended question type, which therefore introduces an uncertainty into actual operational scenarios, and a probability model is thus used to calculate the expected value to approximate the maximization of coverage by maximizing the expected value of the coverage.

In this embodiment, the uncertainty arises from the random event of whether the user can answer the question correctly. The probability model can be used to quantify such uncertainty, and the expected value is the weighted average calculated based on the probability distribution of the random event, which is equivalent to comprehensively considering the coverage under all possible situations. From the average sense of uncertain random events, it provides a probability measure of coverage.

Therefore, under the condition of considering the user's correct answer rate, according to the user's previous correct answer rate in the two sub-fields of S (spatial shape) and R (relationship), if the correct answer rate for the circle A is 0.3, then the expected value of the coverage formed by the question type represented by the circle A is $E(A)=0.3\times11=3.3$. If the correct answer rate for the circle B is 0.5, then the expected value of the coverage formed by the question type represented by the circle B is $E(B)=0.5\times7=3.5$. If the correct answer rate for the circle C is 0.6, then the expected value of the coverage formed by the question type represented by the circle C is $E(C)=0.6\times7=4.2$.

In this embodiment, the correct answer rate is the probability that the question is correctly answered by the user. After multiplying the correct answer rate by the coverage, the expected value of the coverage is obtained. The expected value combines two factors, the difficulty of the question (which is reflected in the correct answer rate) and the coverage. In the case where the system contains uncertainty, the use of the expected value can optimally approximate the uncertain maximum coverage. Furthermore, in the case where the system contains uncertainty, the expected value can provide the optimal solution for the maximum coverage under uncertain conditions and serve as an effective evaluation indicator for the maximum coverage.

Therefore, if the goal is to maximize the expected value of the coverage, the question type of the circle C should be recommended in order to produce the maximum expected value. The above calculation formula for the expected value may further incorporate a weighting coefficient. The set based recommendation method according to the present invention can also influence and interfere with the tendency or preference of the recommended question types by adjusting the weights.

Therefore, the set based recommendation method according to the present invention is further configured to incorporate the uncertainty in answering questions and resolve it through adaptive submodularity. The steps include providing a baseline question, observing the user's answer situation, and then repeating the entire loop K times. It is assumed that the probability distribution of incorrect answers for each question type is known, while an approximate optimal solution can still be found by implementing the greedy algorithm.

The initial conditions for the set based recommendation method according to the present invention include: (1) Pre-defining the coverage function F for each question type. For example, dividing the multi-dimensional space into several small grids and projecting the question type onto the multi-dimensional space to calculate the number of covered grid points. (2) Pre-defining the probability of the correct answer P for each question type, which can preferably be set according to the user's previous answers. If not available, it can be initially set to 50%.

The set based recommendation method according to the present invention can adaptively adjust the recommended question types through real-time interaction, including: (1) If the users answer correctly, update their ability value and include the coverage of the correctly answered question type in the known set $S_g$. (2) If the users answer incorrectly, update their ability value and recommend other question types that cover the incorrectly answered question type in the next question. (3) Select the currently most appropriate recommended question type by dynamically updating the expected value of the coverage.

The set based recommendation method according to the present invention can also influence and interfere with the tendency or preference of recommended question types by adjusting the weights. For example, but not limited to: (1) Increase the weight of the user's weaker sub-fields to prioritize recommending question types in weak sub-field. (2) Increase the weight of challenging question types to prioritize recommending more difficult question types. (3) When the weights are averaged, the user's ability is comprehensively considered to recommend question types with the largest or greatest overall coverage.

Figure 3:
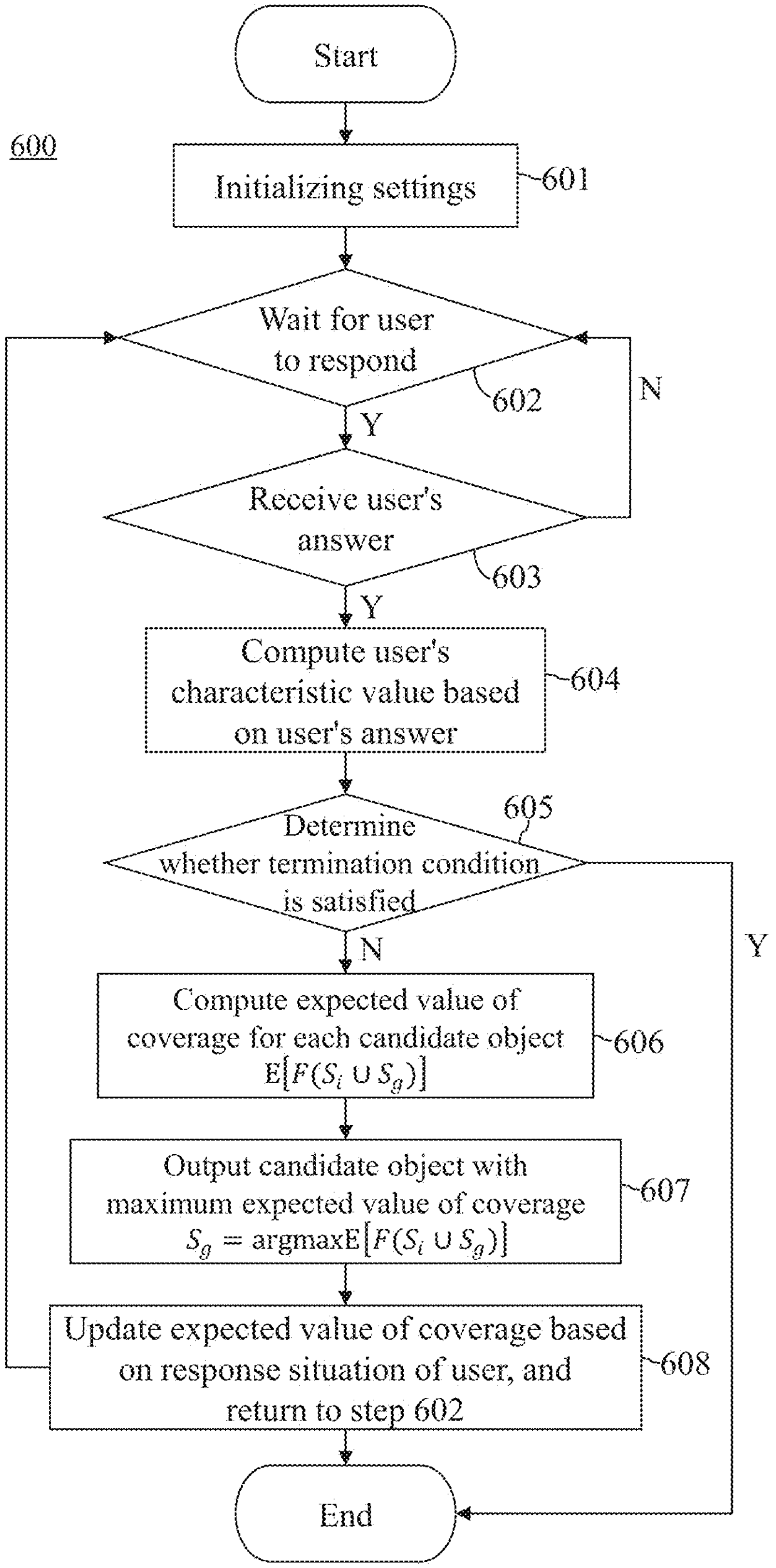
FIG. 3 is a flow chart showing the implementation steps for the set based recommendation method according to the present invention.

FIG. 3 is a flow chart showing the implementation steps for the set based recommendation method according to the present invention. It is assumed that there are N points of interest in the multi-dimensional space and M candidate objects are projected into the multi-dimensional space, the set based recommendation method according to the present invention is configured to recommend the most appropriate question type based on the user's answers in real time.

The first set based recommendation method 600 according to the present invention includes the implementation steps as follows:

Step 601: Initializing settings, including: defining the coverage function F for each question type, recommending baseline question types, and presetting the probability of a correct answer P to 50% or other initial probability distributions.

Step 602: Wait for the user to respond to the baseline question type.

Step 603: Receive the user's answer and use the answer as the user information.

Step 604: Compute the user's characteristic value based on the user's answer. The computation process includes: calculating the coverage $F(S_i \cup S_g)$ for all candidate objects in the current multi-dimensional space, where $S_i$ is the candidate object that may be recommended, and $S_g$ is the previously recommended candidate object. However, if it is the initial time, $S_g$ is set to an empty set.

Step 605: Determine whether the termination condition is satisfied or not. If the system termination condition is met, terminate the calculation; if the system termination condition is not met, proceed to execute the next step 605.

Step 606: Compute the expected value of the coverage for each candidate object. Since it is uncertain what the user's preference is or whether the user will answer correctly for the next object, it is necessary to further calculate the expected value of the coverage $E[F(S_i \cup S_g)]$.

Step 607: Output the candidate object with the maximum expected value of the coverage. Finally, use the candidate object with the maximum expected value of the coverage is used as the recommended object, and then recommend the recommended object $S_g = \arg\max E[F(S_i \cup S_g)]$ with the maximum expected value of the coverage is recommended to the user.

Step 608: Update the expected value of the coverage based on the response situation of the user, such as correct or incorrect answers, and return to perform the step 602 cyclically.

Figure 4:
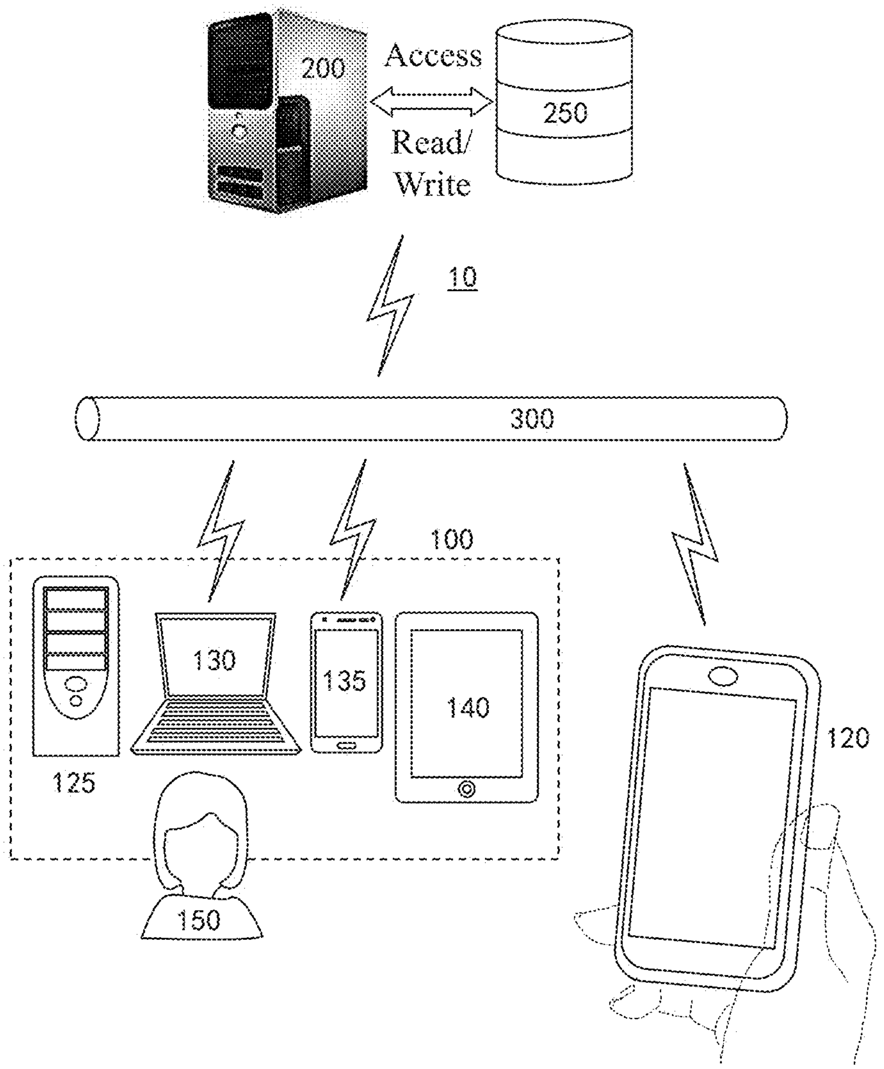
FIG. 4 is a system architecture diagram illustrating the set based recommendation system according to the present invention.
Figure 5:
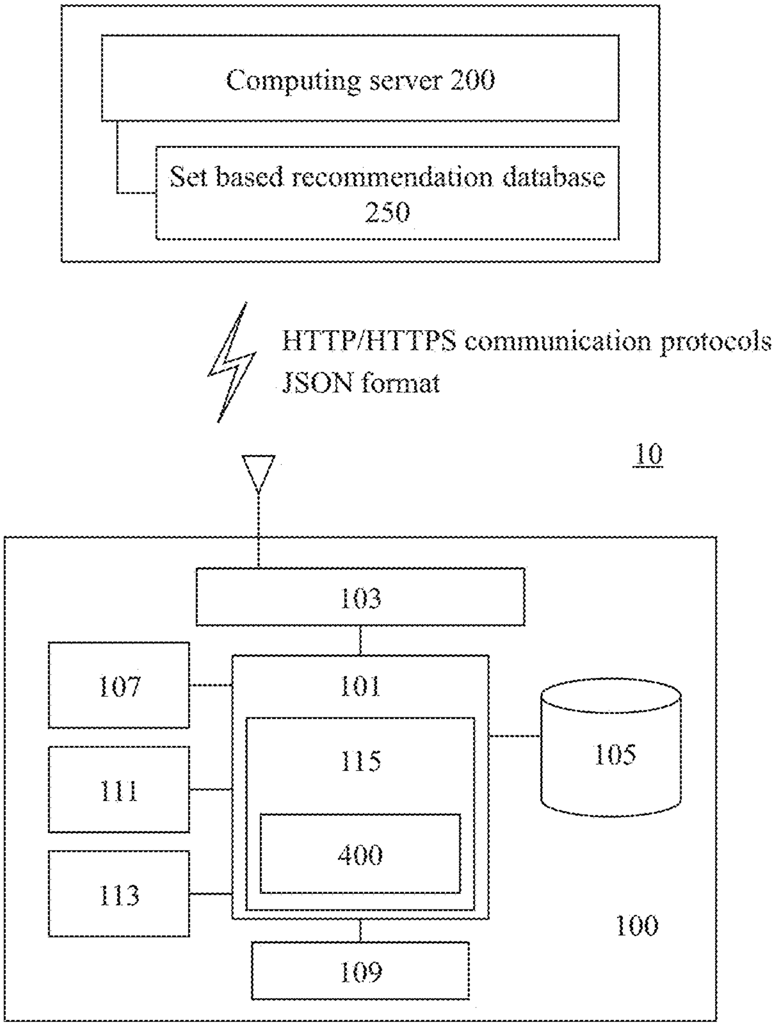
FIG. 5 is a system architecture view illustrating the computing server and user equipment included in the set based recommendation system according to the present invention.

FIG. 4 is a system architecture diagram illustrating the set based recommendation system according to the present invention; FIG. 5 is a system architecture view illustrating the computing server and user equipment included in the set based recommendation system according to the present invention. The set based recommendation method included in the present invention is executed through the set based recommendation system 10, which is connected to various terminal devices via the Internet 300. In this embodiment, the set based recommendation system 10 includes a computing server 200 configured at the back end or remote end, i.e., the server end, based on the client-server model, and user equipment 100 configured at the front end or local end, i.e., located at the client end, serving as the set based recommendation device. The user equipment 100 is preferably a mobile device 120, a desktop computer 125, a laptop computer 130, a smartphone 135, or a tablet device 140, etc. The computing server 200 is configured to establish communication connections with multiple user equipment 100 via the Internet 300 to perform two-way communication and data exchange.

The user equipment 100 includes hardware units such as a processor unit 101, a wireless RF communication module 103, a flash memory 105, a touch screen unit (display unit) 107, a photography unit 109, an audio unit 111, and a vibration unit 113, which are electrically connected to each other inside, as well as program components such as the set based recommendation application 115 executed in the processor unit 101 and the set based recommendation operation interface 400 included in the set based recommendation application 115. The set based recommendation application 115 is installed on the user equipment 100 and executed by being loaded by the processor unit 101.

The computing server 200 includes at least one set based recommendation database 250, which may be a storage unit built and stored within the computing server 200, or built separately from the computing server 200 and stored separately on another separate device. Between the set based recommendation application 115 executed on the user equipment 100 and the set based recommendation database 250 of the computing server 200, it is preferable to use protocols such as, but not limited to, HTTP/HTTPS communication protocols, and to use formats such as, but not limited to, JSON format for data exchange and two-way communication.

When a user 150, such as a student, opens the set based recommendation application 115 on the user equipment 100 and is loaded and executed by the processor unit 101, the set based recommendation application 115 is configured to execute a set based recommendation operation interface 400 to generate a shortcut operation interface on the touch screen unit 107 through the set based recommendation operation interface 400. The shortcut operation interface is preferably, for example, but not limited to, a set of graphical user interfaces (GUI), a quick menu based on one-click operation, a shortcut operation web page, a shortcut list, shortcut buttons, a graphical shortcut operation interface, a floating convenient option menu window, a drop-down option menu, a shortcut option menu, or an interactive web page, to provide the user 150 with touch and operation through the touch screen unit 107.

The set based recommendation method according to the present invention can also be implemented by executing the set based recommendation application 115. The set based recommendation application 115 is preferably a front-end application that is compatible with the two mainstream device platforms of current smartphones in the market, including Android and iOS systems. For Android devices, the set based recommendation application 115 is developed using the Android Studio design editor. The remote server program and software system is configured to preferably use scripts such as but not limited to PUP (Personal Homepage Program) to access the MySQLDB relational database to send and receive data. MySQLDB is a multi-user, multi-threaded SQL database server that can effectively organize, archive, and tabulate a database software for more efficient subsequent querying, sorting, sending, and receiving of data. For iOS devices, the set based recommendation application 115 preferably uses components such as but not limited to Xcode and UIKit to develop and design the application program (App) interface, using the Objective-C or Swift programming language for development.

The processor unit 101 receives instructions issued by the set based recommendation application 115 and, in accordance with the instructions, connects to the computing server 200 via the wireless RF communication unit 103 and accesses the set based recommendation database 250, including reading the required data or writing data, and downloads it to the client's user equipment 100. By processing the set based recommendation application 115 and the set based recommendation operation interface 400 contained within the set based recommendation application 115, it is finally displayed to the user on the touch screen unit 107 through a graphical user interface or a quick menu.

The set based recommendation application 115 and the set based recommendation operation interface 400 or other program components contained within the set based recommendation application 115, as well as the remote server programs or software systems, can be programmed and implemented using any programming language, including but not limited to C, C++, C#, Java, VBScript, Macromedia Cold Fusion, COBOL, Microsoft Active Server Pages, Assembly Language, PERL, PUP, awk, Python, Visual Basic, SQL Stored Procedures, PL/SQL, any UNIX shell script, and Extensible Markup Language (XML) with various algorithms embodied in the form of data structures, objects, processes, routines or other programming components.

In some embodiments, the program components, modules, or software engines configured on the user equipment 100 can be implemented in the form of a set based recommendation application (App) 115 or a micro App. These set based recommendation applications 115 or micro Apps can run in a mobile operating system environment, covering mobile operating systems such as Palm OS, Windows Mobile, Android OS, Apple iOS, Blackberry OS, etc.

The set based recommendation system 10 and user equipment 100 proposed in the present invention, in the front-end program part, in addition to being built as an application for users to operate, can also be built by off-premises deployment using cloud technologies such as Software as a Service (SaaS) or Platform as a Service (PaaS), and directly provided to users for operation through an Internet browser executed on the user equipment 100 as a front-end user interface, thereby providing set based recommendation services to users. In the case of using SaaS or PaaS services, users only need to obtain permissions to access and use the system online, and users do not need to install applications on their mobile devices.

Figure 6:
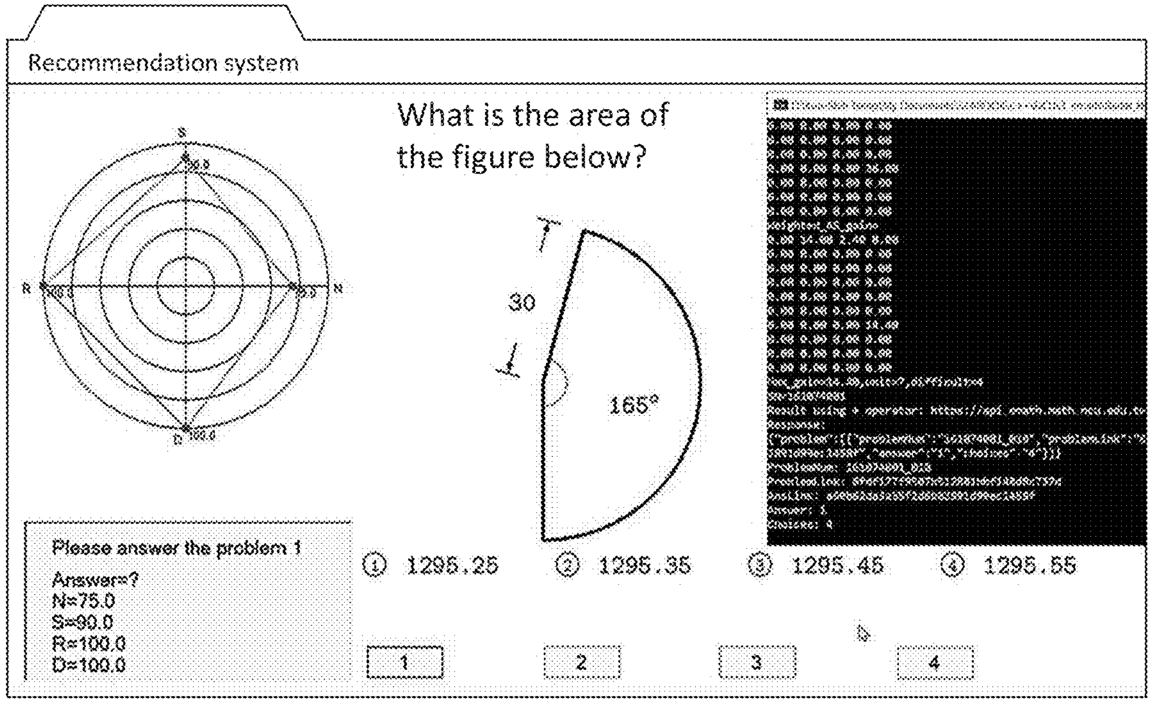
FIG. 6 is a schematic diagram illustrating the set based recommendation operation interface included in the present invention.

FIG. 6 is a schematic diagram illustrating the set based recommendation operation interface included in the present invention. FIG. 6 depicts the set based recommendation operation interface 400 included in the present invention. The set based recommendation operation interface 400 is provided to the user equipment 100, such as a smartphone, for the user to operate through a PaaS system. The user can answer questions on the set based recommendation operation interface 400. The set based recommendation system is configured to receive the user's answers through the set based recommendation operation interface 400 and compute the maximum expected value of the coverage accordingly, and then output the most appropriate recommended questions to the set based recommendation operation interface 400.

Figure 7:
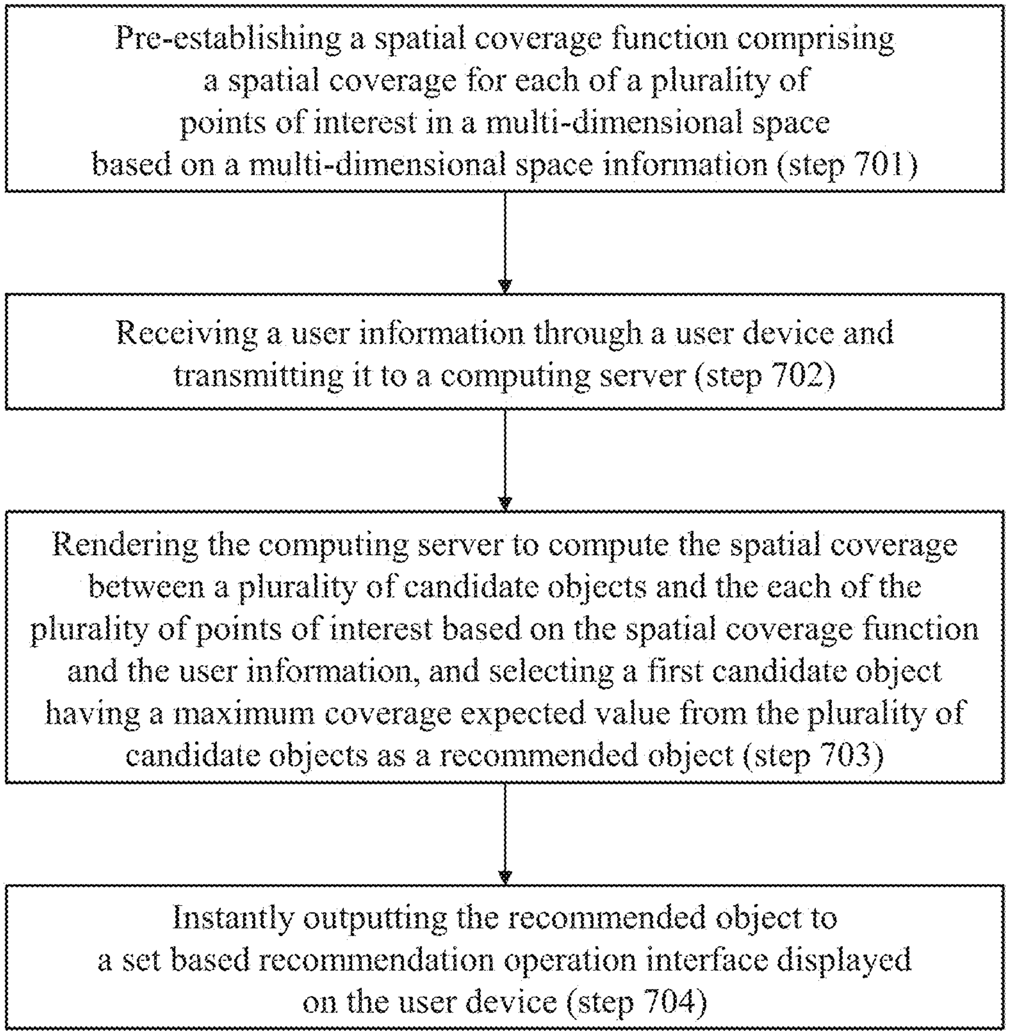
FIG. 7 is a flow chart showing the implementation steps for the set based recommendation method according to the present invention.

FIG. 7 is a flow chart showing the implementation steps for the set based recommendation method according to the present invention. In summary, the set based recommendation method 700 according to the present invention preferably includes the steps as follows: pre-establishing a spatial coverage function comprising a spatial coverage for each of a plurality of points of interest in a multi-dimensional space based on a multi-dimensional space information (step 701); receiving a user information through a user device and transmitting it to a computing server (step 702); rendering the computing server to compute the spatial coverage between a plurality of candidate objects and the each of the plurality of points of interest based on the spatial coverage function and the user information, and selecting a first candidate object having a maximum coverage expected value from the plurality of candidate objects as a recommended object (step 703); and instantly outputting the recommended object to a set based recommendation operation interface displayed on the user device (step 704).

In summary, the present invention utilizes the concept of maximum coverage to design a set based recommendation system. By mapping multiple question types to a multi-dimensional space of user abilities and dynamically adjusting based on user interaction feedback, it recommends the most appropriate question types for the current situation, helping users to strengthen weaknesses and expand their knowledge. The system is flexible and can be applied to various fields requiring knowledge point assessment, such as but not limited to: mathematics, languages, music, cooking, etc.

There are further embodiments provided as follows.

Embodiment 1: A set based recommendation method includes: pre-establishing a spatial coverage function comprising a spatial coverage for each of a plurality of points of interest in a multi-dimensional space based on a multi-dimensional space information; receiving a user information through a user device and transmitting it to a computing server; rendering the computing server to compute the spatial coverage between a plurality of candidate objects and the each of the plurality of points of interest based on the spatial coverage function and the user information, and selecting a first candidate object having a maximum coverage expected value from the plurality of candidate objects as a recommended object; and instantly outputting the recommended object to a set based recommendation operation interface displayed on the user device.

Embodiment 2: The set based recommendation method according to Embodiment 1 further includes: calculating a characteristic value of the user based on the user information.

Embodiment 3: The set based recommendation method according to Embodiment 1, each of the plurality of candidate objects has a coverage expected value that is proportional to the product of a number of points of interest it covers and the characteristic value.

Embodiment 4: A set based recommendation system includes: a user device configured to receive a user information; and a computing server configured to receive the user information, compute a spatial coverage between a plurality of candidate objects and each of a plurality of points of interest based on a spatial coverage function and the user information, select a first candidate object having a maximum coverage expected value from the plurality of candidate objects as a recommended object, and instantly output the recommended object to a set based recommendation operation interface displayed on the user device, wherein the spatial coverage function is pre-established based on a multi-dimensional space information and comprises the spatial coverage for the each of the plurality of points of interest in a multi-dimensional space.

Embodiment 5: The set based recommendation system according to Embodiment 4, the user device and the computing server are communicatively connected to each other through a network.

Embodiment 6: The set based recommendation system according to Embodiment 4, the user device is a mobile device, a desktop computer, a laptop, a smartphone, a microprocessor, or a tablet device.

Embodiment 7: A set based recommendation device includes: a display unit configured to display a set based recommendation operation interface for receiving a user information; and a processor unit configured to receive the user information, compute a spatial coverage between a plurality of candidate objects and each of a plurality of points of interest based on a spatial coverage function and the user information, select a first candidate object having a maximum coverage expected value from the plurality of candidate objects as a recommended object, and instantly output the recommended object to a set based recommendation operation interface displayed on the user device, wherein the spatial coverage function is pre-established based on a multi-dimensional space information and comprises the spatial coverage for the each of the plurality of points of interest in a multi-dimensional space.

Embodiment 8: The set based recommendation device according to Embodiment 7, the set based recommendation device is a mobile device, a desktop computer, a laptop, a smartphone, a microprocessor, or a tablet device.

While the disclosure has been described in terms of what are presently considered to be the most practical and preferred embodiments, it is to be understood that the disclosure need not be limited to the disclosed embodiments. On the contrary, it is intended to cover various modifications and similar arrangements included within the spirit and scope of the appended claims, which are to be accorded with the broadest interpretation so as to encompass all such modifications and similar structures. Therefore, the above description and illustration should not be taken as limiting the scope of the present disclosure which is defined by the appended claims.

What is claimed is:

1. A computer-implemented set based recommendation method for successively and adaptively presenting questions to a user through a set based recommendation operation interface, comprising:

pre-establishing a spatial coverage function defining respective spatial coverage rates for a plurality of candidate question types, each of the respective spatial coverage rates indicating a number of knowledge points covered by a respective one of the plurality of candidate question types in a multi-dimensional ability space based on a multi-dimensional space information;

displaying, through the set based recommendation operation interface comprising a graphical user interface displayed on a user device, a question for the user to answer;

receiving, through the set based recommendation operation interface, an answer submitted by the user in response to the question;

transmitting, by the user device, a user information comprising the answer to a computing server executing a set based recommendation software engine comprising the spatial coverage function;

in response to receiving the user information, comparing, by the set based recommendation software engine, the answer with a correct answer to the question and updating, by the set based recommendation software engine, a characteristic value of the user based on a result of the comparison;

in response to updating the characteristic value, computing, by the set based recommendation software engine, respective coverage expected values for the plurality of candidate question types based on the spatial coverage function and the user information, wherein each of the respective coverage expected values is computed based on one of the respective spatial coverage rates defined for the same respective one of the plurality of candidate question types and the updated characteristic value;

selecting, by the set based recommendation software engine, a first candidate question type having a maximum one of the respective coverage expected values as a recommended question type;

in response to selecting the recommended question type, instantly outputting, by the set based recommendation software engine, a subsequent question corresponding to the recommended question type to the same set based recommendation operation interface displayed on the user device for the user to answer;

receiving, through the same set based recommendation operation interface, a further answer submitted by the user in response to the subsequent question, and transmitting, by the user device, a further user information comprising the further answer to the computing server for processing by the set based recommendation software engine; and in response to receiving the further user information, comparing, by the set based recommendation software engine, the further answer with a correct answer to the subsequent question and updating, by the set based recommendation software engine, at least one of the characteristic value and the respective coverage expected values based on a result of comparing the further answer with the correct answer to the subsequent question, and, based on the at least one of the characteristic value and the respective coverage expected values as updated, selecting, by the set based recommendation software engine, a next candidate question type and instantly outputting a next question corresponding to the next candidate question type to the same set based recommendation operation interface displayed on the user device for the user to answer.

2. The computer-implemented set based recommendation method according to claim 1, wherein updating the characteristic value comprises:

calculating the characteristic value of the user based on the user information.

3. The computer-implemented set based recommendation method according to claim 1, wherein the respective coverage expected value of each of the plurality of candidate question types is proportional to a product of the number of knowledge points covered by the respective candidate question type and the updated characteristic value.

4. A set based recommendation system for successively and adaptively presenting questions to a user through a set based recommendation operation interface, comprising:

a user device configured to display, through the set based recommendation operation interface comprising a graphical user interface displayed on the user device, a question for the user to answer, receive, through the set based recommendation operation interface, an answer submitted by the user in response to the question, transmit a user information comprising the answer to a computing server, receive, through the same set based recommendation operation interface, a further answer submitted by the user in response to a subsequent question, and transmit a further user information comprising the further answer to the computing server, wherein a spatial coverage function defining respective spatial coverage rates for a plurality of candidate question types, each of the respective spatial coverage rates indicating a number of knowledge points covered by a respective one of the plurality of candidate question types in a multi-dimensional ability space based on a multi-dimensional space information is pre-established; and the computing server executing a set based recommendation software engine comprising the spatial coverage function, the set based recommendation software engine configured to, in response to receiving the user information, compare the answer with a correct answer to the question and update a characteristic value of the user based on a result of the comparison, in response to updating the characteristic value, compute respective coverage expected values for the plurality of candidate question types based on the spatial coverage function and the user information, wherein each of the respective coverage expected values is computed based on one of the respective spatial coverage rates defined for the same respective one of the plurality of candidate question types and the updated characteristic value, select a first candidate question type having a maximum one of the respective coverage expected values as a recommended question type, in response to selecting the recommended question type, instantly output the subsequent question corresponding to the recommended question type to the same set based recommendation operation interface displayed on the user device for the user to answer, and, in response to receiving the further user information, compare the further answer with a correct answer to the subsequent question, update at least one of the characteristic value and the respective coverage expected values based on a result of comparing the further answer with the correct answer to the subsequent question, and, based on the at least one of the characteristic value and the respective coverage expected values as updated, select a next candidate question type and instantly output a next question corresponding to the next candidate question type to the same set based recommendation operation interface displayed on the user device for the user to answer.

5. The set based recommendation system according to claim 4, wherein the user device and the computing server are communicatively connected to each other through a network.

6. The set based recommendation system according to claim 4, wherein the user device is a mobile device, a desktop computer, a laptop, a smartphone, a microprocessor, or a tablet device.

7. A set based recommendation device for successively and adaptively presenting questions to a user through a set based recommendation operation interface, comprising:

a touch display unit configured to display the set based recommendation operation interface comprising a graphical user interface, display, through the set based recommendation operation interface, a question for the user to answer, receive, through the set based recommendation operation interface, an answer submitted by the user in response to the question, and receive, through the same set based recommendation operation interface, a further answer submitted by the user in response to a subsequent question, wherein a spatial coverage function defining respective spatial coverage rates for a plurality of candidate question types, each of the respective spatial coverage rates indicating a number of knowledge points covered by a respective one of the plurality of candidate question types in a multi-dimensional ability space based on a multi-dimensional space information is pre-established; and a processor unit executing a set based recommendation software engine comprising the spatial coverage function, the set based recommendation software engine configured to, in response to receiving the answer, compare the answer with a correct answer to the question and update a characteristic value of the user based on a result of the comparison, in response to updating the characteristic value, compute respective coverage expected values for the plurality of candidate question types based on the spatial coverage function and the answer, wherein each of the respective coverage expected values is computed based on one of the respective spatial coverage rates defined for the same respective one of the plurality of candidate question types and the updated characteristic value, select a first candidate question type having a maximum one of the respective coverage expected values as a recommended question type, in response to selecting the recommended question type, instantly output the subsequent question corresponding to the recommended question type to the same set based recommendation operation interface for the user to answer, and, in response to receiving the further answer, compare the further answer with a correct answer to the subsequent question, update at least one of the characteristic value and the respective coverage expected values based on a result of comparing the further answer with the correct answer to the subsequent question, and, based on the at least one of the characteristic value and the respective coverage expected values as updated, select a next candidate question type and instantly output a next question corresponding to the next candidate question type to the same set based recommendation operation interface for the user to answer.

8. The set based recommendation device according to claim 7, wherein the set based recommendation device is a mobile device, a desktop computer, a laptop, a smartphone, a microprocessor, or a tablet device.

* * * * *